(12) United States Patent
Stern et al.

(10) Patent No.: US 12,075,144 B2
(45) Date of Patent: *Aug. 27, 2024

(54) METHOD AND SYSTEM FOR A TRAIL CAMERA WITH MODULAR FRESNEL LENSES

(71) Applicant: Tactacam LLC, Caledonia, MN (US)

(72) Inventors: Benjamin Stern, Holmen, WI (US);
Garrison Peel, Caledonia, MN (US);
Jeff Peel, Decorah, IA (US)

(73) Assignee: DEER MANAGEMENT SYSTEMS, LLC, Caledonia, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/990,479

(22) Filed: Nov. 18, 2022

(65) Prior Publication Data

US 2023/0079038 A1 Mar. 16, 2023

Related U.S. Application Data

(63) Continuation of application No. 17/192,642, filed on Mar. 4, 2021, now Pat. No. 11,509,802.

(51) Int. Cl.
*H04N 23/55* (2023.01)
*G01J 5/00* (2022.01)
(Continued)

(52) U.S. Cl.
CPC ............ *H04N 23/55* (2023.01); *G01J 5/0025* (2013.01); *G03B 17/561* (2013.01); *H04N 7/183* (2013.01);
(Continued)

(58) Field of Classification Search
CPC ........ H04N 23/55; H04N 7/183; H04N 7/188; H04N 23/45; H04N 23/54; H04N 23/661;
(Continued)

(56) References Cited

U.S. PATENT DOCUMENTS 6,376,840 B1 4/2002 Ko
10,965,914 B2 3/2021 D'Acquisto
(Continued)

OTHER PUBLICATIONS

International Search Report and Written Opinion for PCT/US2022/018499, dated Mar. 23, 2022, 8 pages.

*Primary Examiner* — John R Schnurr
(74) *Attorney, Agent, or Firm* — McAndrews, Held & Malloy, Ltd.

(57) ABSTRACT

A cellular trail camera system is disclosed and may include a housing; a mounting bracket for mounting the camera; a visible sensor; an infrared sensor; and a plurality of Fresnel lenses each operable to be individually mounted to or with the infrared sensor and to focus infrared light to the infrared sensor from a different direction. One of the Fresnel lenses may be mounted to or with the housing during operation. The housing may include a wireless transceiver, which may communicate via a cellular network. The camera may communicate with a wireless communication device via the wireless transceiver. The camera may communicate images and/or video to the wireless device. The infrared sensor may include a plurality of elements. The camera may be powered by a solar cell that is mounted on the camera or remote from the camera. The visible sensor may be activated when the infrared sensor detects a heat-generating object.

16 Claims, 6 Drawing Sheets

(51) Int. Cl.
*G03B 17/56* (2021.01)
*H04N 7/18* (2006.01)
*H04N 23/45* (2023.01)
*H04N 23/54* (2023.01)
*H04N 23/661* (2023.01)
*G02B 3/08* (2006.01)
*G02B 7/14* (2021.01)
*H02S 99/00* (2014.01)
*H04B 1/3827* (2015.01)

(52) U.S. Cl.
CPC ............. *H04N 7/188* (2013.01); *H04N 23/45* (2023.01); *H04N 23/54* (2023.01); *H04N 23/661* (2023.01); *G02B 3/08* (2013.01); *G02B 7/14* (2013.01); *H02S 99/00* (2013.01); *H04B 1/3827* (2013.01)

(58) Field of Classification Search
CPC ....... H04N 23/51; H04N 23/65; G01J 5/0025; G01J 2005/0077; G01J 5/025; G01J 5/026; G01J 5/0265; G01J 5/028; G01J 5/0806; G01J 5/0859; G03B 17/561; G03B 19/22; G02B 3/08; G02B 7/14; H02S 99/00; H04B 1/3827
See application file for complete search history.

(56) References Cited

U.S. PATENT DOCUMENTS

| | | | |
|---|---|---|---|
| 11,509,802 B2 * | 11/2022 | Stern | G01J 5/026 |
| 2005/0127298 A1 | 6/2005 | DiPoala | |
| 2010/0012016 A1 | 1/2010 | Viala | |
| 2011/0242315 A1 | 10/2011 | Barley et al. | |
| 2013/0010109 A1 | 1/2013 | Chen et al. | |
| 2014/0098256 A1 | 4/2014 | Cuddeback et al. | |
| 2018/0174413 A1 * | 6/2018 | Siminoff | H04N 7/186 |
| 2019/0362507 A1 | 11/2019 | Papari | |
| 2020/0111335 A1 * | 4/2020 | Gagnon | G06V 20/52 |
| 2021/0250504 A1 | 8/2021 | Buck | |
| 2022/0223017 A1 * | 7/2022 | Wong | G08B 13/19669 |
| 2023/0217100 A1 * | 7/2023 | Ho | H04N 23/651 348/207.1 |

\* cited by examiner

METHOD AND SYSTEM FOR A TRAIL CAMERA WITH MODULAR FRESNEL LENSES

CROSS-REFERENCE TO RELATED APPLICATIONS

The present application is a continuation of U.S. patent application Ser. No. 17/192,642, filed Mar. 4, 2021, the disclosure of which is hereby incorporated by reference in its entirety.

FIELD

Aspects of the present disclosure relate to trail cameras. More specifically, certain embodiments of the disclosure relate to a method and system for a trail camera with modular Fresnel lenses.

BACKGROUND

Conventional approaches for trail cameras may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

Camera systems and methods are provided, substantially as illustrated by and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Some embodiments of the present disclosure relate to camera systems and, in particular, a camera system that utilizes modular Fresnel lenses.

Figure 1:
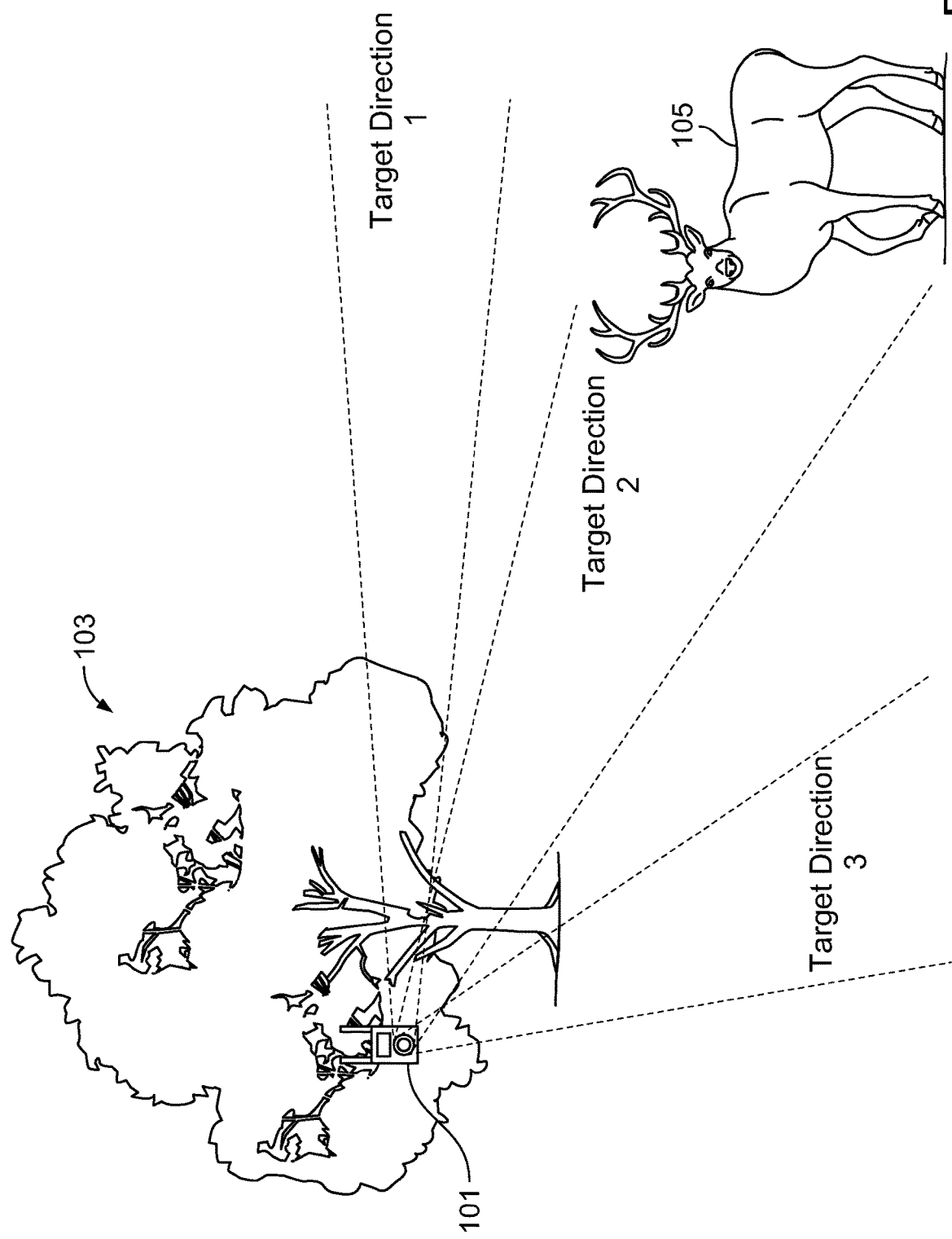
FIG. 1 illustrates a trail camera application, in accordance with an example embodiment of the disclosure.

FIG. 1 illustrates a trail camera application, in accordance with an example embodiment of the disclosure. Referring to FIG. 1, there is shown a trail camera 101, a tree 103, and photo target 105. A tree is used to mount the trail camera 101 in this example, although any available fixed structure would be acceptable, such as a tree stand, fence, post, or vine, for example. The trail camera 101 comprises an infrared (IR) sensor for detecting passing animals and a visible light camera for capturing images and/or video of sensed animals. The camera 101 also comprises wireless communication capability for sending images and videos to other devices, as well as for receiving commands from devices.

Images and/or video may be stored in and/or transmitted from the camera 101. Accordingly, the camera 101 may comprises a processor, wireless communication circuitry, memory, and storage, for example. The infrared sensor in the camera 101 may comprise a passive IR sensor, for example, with a plurality of elements, such that a differential signal between elements indicates the movement of a target. In this manner, the camera 101 does not simply detect motion, such as a branch moving in the wind, but senses the motion of heat-generating objects.

Trail cameras may be mounted on different structures and at different heights, such that captured images may or may not include a desired target depending on the camera alignment. The infrared sensor angle of view may typically be more narrow than the visible camera so that only targets in a certain region are sensed. In an example embodiment, the camera 101 may comprise a modular Fresnel lens that provides a configurable infrared sensing angle-of-view. For example, if a user mounts the camera 101 higher up, a Fresnel lens that is directed downward may be utilized. Similarly, if a trail camera is mounted near ground-level, a straight ahead or upward aiming Fresnel lens may be utilized. Fresnel lenses typically comprise concentric annular sections enabling a thinner and lighter weight lens than would be needed using a conventional spherical lens.

FIG. 1 illustrates Target Directions 1, 2, and 3, where each one represents the angle-of-view that would result with a different Fresnel lens on the IR sensor in the camera 101. If a Fresnel lens with a straight-ahead angle-of-view was mounted on the camera 101, Target Direction 1 would result, not sensing the target 105, and if a downward-looking Fresnel lens were mounted, Target Direction 3 would result, again not sensing the target 105. A less downward-angle field-of-view Fresnel would result in Target Direction 2, sensing the target 105, causing the camera 101 to capture an image and/or video of the target 105.

As users choose to hang their camera at different heights, it may create a problem for conventional cameras with getting them set to the correct detection zone for the animal the user is trying to capture. The camera 101 enables the user to easily change between different Fresnel lenses, giving them the ability to correctly select the detection zone for the height that they choose to hang the camera. This will greatly increase the number of successful pictures and/or video captured.

The camera 101 may be communicatively coupled to a wireless device, such as a cell phone, with an application for configuring the camera 101 once the Fresnel lens is affixed. The application may interact with the lens number the user selects, showing the user while hanging the camera, what target zone is being created. In this manner, users may hang their cameras at any height and have a customizable detection zone. The application allows the user to enter the height of the camera and the lens selected and may then show the detection zone in a live photo so the user knows exactly where they are targeting.

Figure 2:
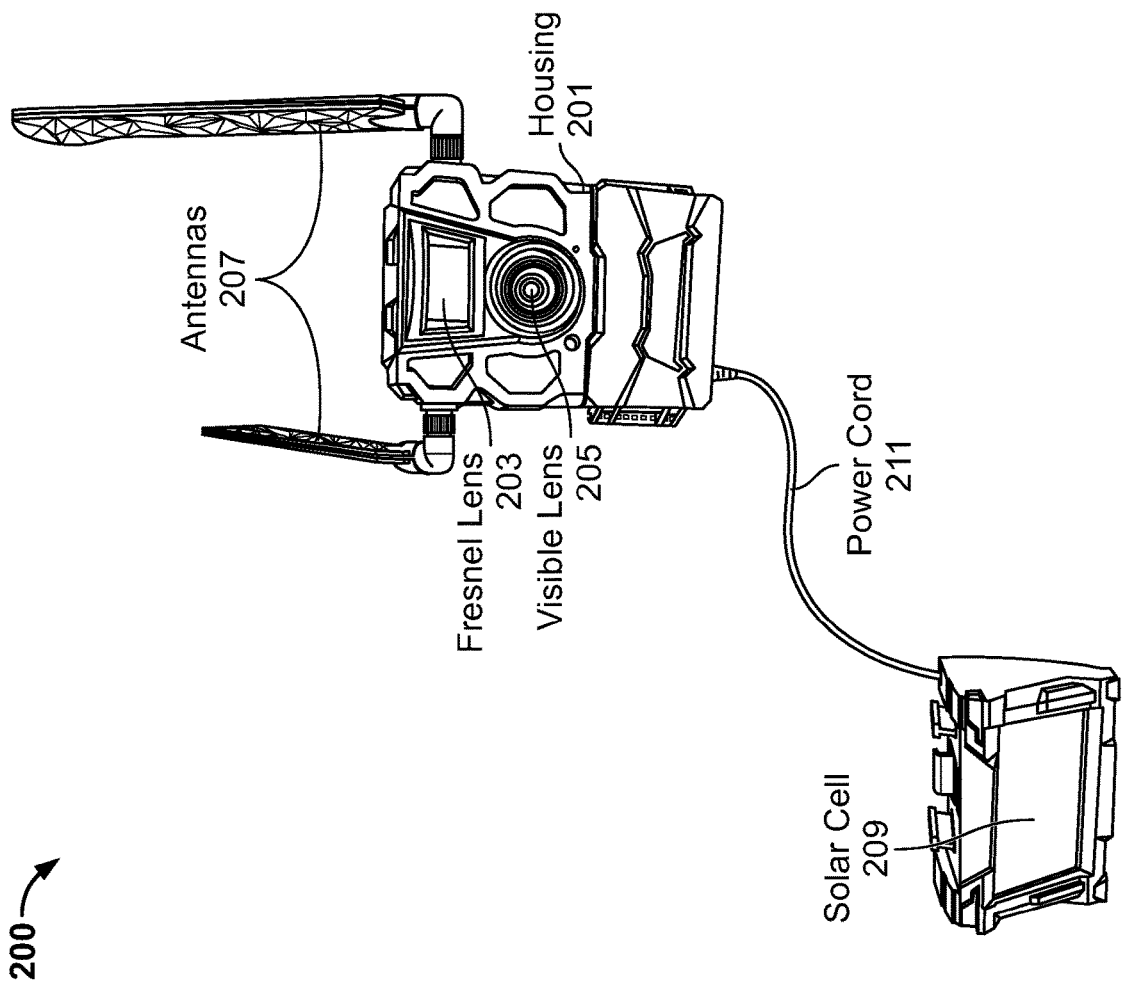
FIG. 2 illustrates front and side views of a trail camera, in accordance with an example embodiment of the disclosure.

FIG. 2 illustrates front and side views of a trail camera, in accordance with an example embodiment of the disclosure.

Referring to FIG. 2, the camera 200 may comprise a housing 201, a Fresnel lens 203, a visible lens 205, antennas 207, a solar cell 209, a power cord 211, and a mounting bracket 213.

The housing 201 may comprise a plastic, or other suitable lightweight material, structural framework that houses the Fresnel lens 203 and visible lens 205, as well as circuitry, a battery, an image sensor, and an IR sensor that are all sealed and protected from the elements (e.g., precipitation, wind, etc.) by the housing 201. The antennas 207 may be coupled to the housing via electrical connectors on the surface of the housing 201, thereby providing enhanced transmission and reception capability of wireless communications circuitry in the camera 200. The visible lens 205 may focus visible light onto an internal image sensor, such as a CCD or CMOS sensor, for example.

In an example scenario, the Fresnel lens 203 may be modular, such that it may easily be removed from the camera 200 and replaced with a different Fresnel lens to configure the angle-of-view and/or focal length. Each Fresnel lens may have a different ridge pattern with a different focal range and/or direction. For example, a different Fresnel lens 203 may be used for each target direction shown in FIG. 1. In this manner, the camera 200 may be mounted in many different locations using the mounting bracket 213, but still target the IR sensor in a desired direction. The mounting bracket 213 may comprise a quick release mechanism so that the camera 200 may be temporarily detached while leaving the mounting bracket on the support structure on which the camera 200 is mounted. In addition, the mounting bracket may be hinged to enable further aiming of the camera 200.

An IR sensor behind the Fresnel lens 203 may comprise a passive IR sensor with a plurality of sensing elements, such that a change in a differential signal between different elements may indicate the movement of a heat-generating animal in the viewing angle of the Fresnel lens 203. The solar cell 209 may comprise a modular structure, either attached to the housing 201 using a strap and/or threaded connectors in the housing 201, or mounted remotely from the housing 201, depending on sunlight availability in the mounting location. Furthermore, the power cord 211 may be different lengths, up to 6-10 feet or longer, to allow further solar cell 209 mounting distances. A plurality of different power cords 211 of different length may be utilized depending on the mounting location of the solar cell 209. In addition, the power cord 211 may be armored with a protective sheath, such as braided wire for example, to protect from chewing by wildlife and/or sun/weather damage.

In operation, the camera 200 may be mounted to a structure, such as a tree, for example, and activated using a wireless device, such as a cell phone. The camera 200 may transmit a live view of images or video captured via a sensor behind the visible lens 205 to the wireless device via the antennas 207. Based on the specific Fresnel lens 203 and its known direction-of-view and/or focal length, this range may be superimposed on the live view so the user can see where the IR sensor is directed with respect to the visible field-of-view. Once the desired viewing region is configured, the camera 200 may go into operational mode, which may comprise a lower power mode, where the visible sensor is deactivated, communication circuitry is in a standby mode, and only the IR sensor is being sensed.

In instances where a heat-generating animal moves within the viewing angle/focal range of the Fresnel lens 203, an IR signal may be sensed by the IR sensor behind the Fresnel lens 203. The sensed motion may cause the camera 200 to activate the visible camera sensor behind the visible lens 205 to begin capturing images and/or video of the target. The image sensor may generate analog or digital signals, where analog signals may be converted into digital data that may be stored in the camera 200. In some embodiments, the image sensor converts the received image into monochrome or multi-color pixel signals or data that may be further processed by circuitry in the housing 201. The image signal may be further processed, stored, and/or transmitted. In some embodiments, the camera 200 may store and/or process images for pictures or images for use in videos. In the case of videos, the camera 200 may also comprise a microphone for capturing sound for playback in the video.

Figure 3:
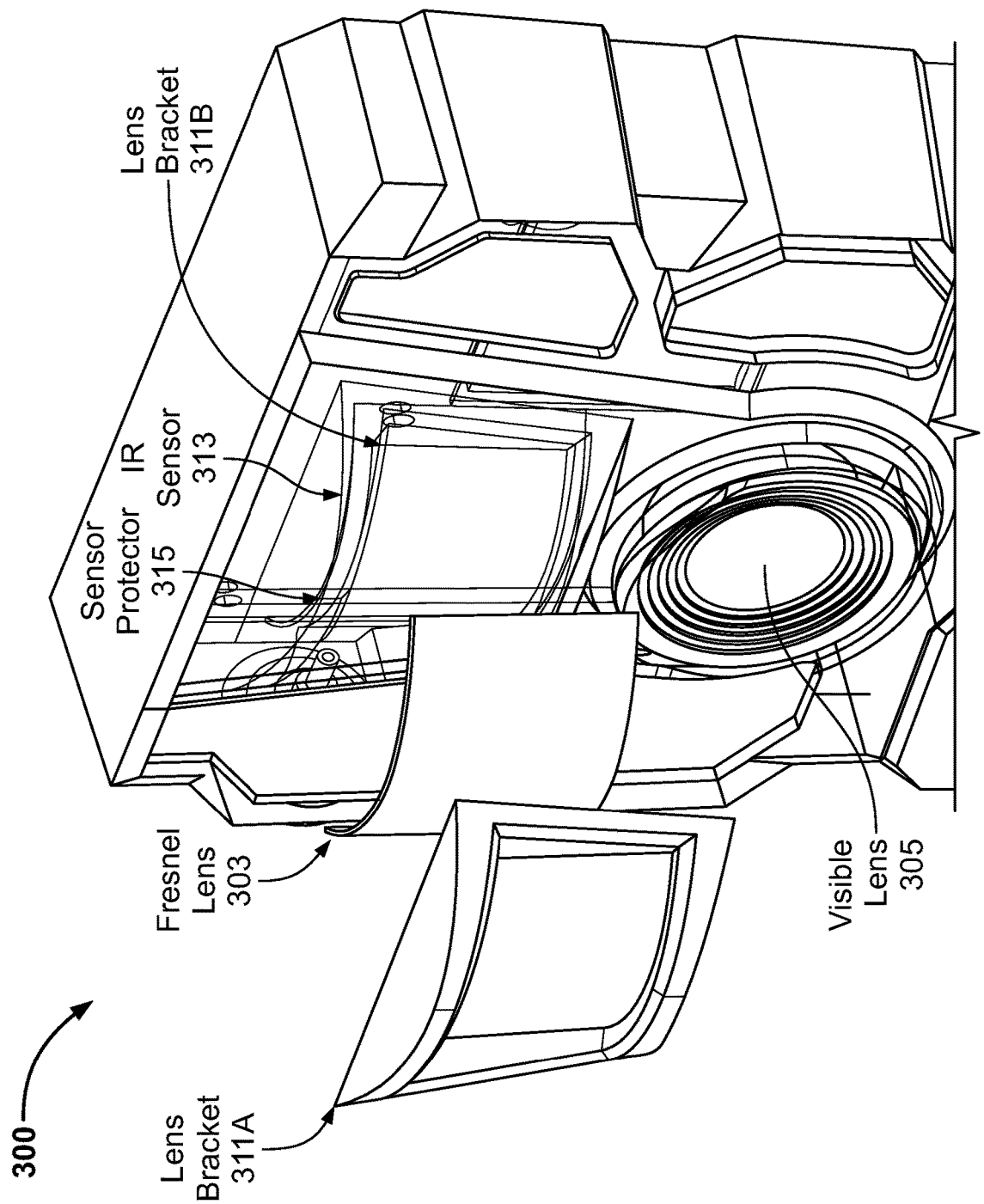
FIG. 3 illustrates an exploded view of a cellular trail camera with modular Fresnel lens, in accordance with an example embodiment of the disclosure.

FIG. 3 illustrates an exploded view of a cellular trail camera with modular Fresnel lens, in accordance with an example embodiment of the disclosure. Referring to FIG. 3, there is shown camera 300 comprising Fresnel lens 303, visible lens 305, lens brackets 311A and 311B, IR sensor 313, and sensor protector 315.

The Fresnel lens 303 may be as described previously with respect to Fresnel lens 203, with a pattern of lines/ridges for configuring the focal length and sensing direction of the lens. The lens brackets 311A and 311B comprise a removable bracket 311A and a fixed bracket 311B, between which the Fresnel lens 303 may be arranged, thereby providing a removable lens for the IR sensor 313. In addition, the sensor protector 315 may comprise an IR transparent material for protecting the IR sensor 313 when the Fresnel lens 303 is being changed. The Fresnel lens 303 may comprise plastic, or other flexible material, that may be curved to provide a wider possible angle-of-view. The visible lens 305 may be operable to focus visible light on a visible light sensor, such as a CCD or CMOS sensor for capturing images and/or video when activated. Activation may be from user input, from motion sensing by the IR sensor 313, or from an activation signal from a wireless device, for example.

Different Fresnel lenses may be utilized in the camera 300, each with different angle-of-view and/or focal length, for example. For example, if the camera were to be mounted at a high elevation above ground, a downward-looking Fresnel may be utilized, or if it is desired to sense targets from one particular side, a specific Fresnel lens may be utilized with such an angle-of-view.

The IR sensor 313 may comprise a semiconductor sensor with a plurality of elements, each configured to sense infrared electromagnetic radiation, and specifically sense IR wavelengths corresponding to animal body temperature, for example. Materials other than semiconductors are possible, as long as they sense infrared wavelengths. Multiple elements in the IR sensor 313 enable motion sensing, where a change in a differential signal between elements indicates motion of a heat-generating object.

Figure 4:
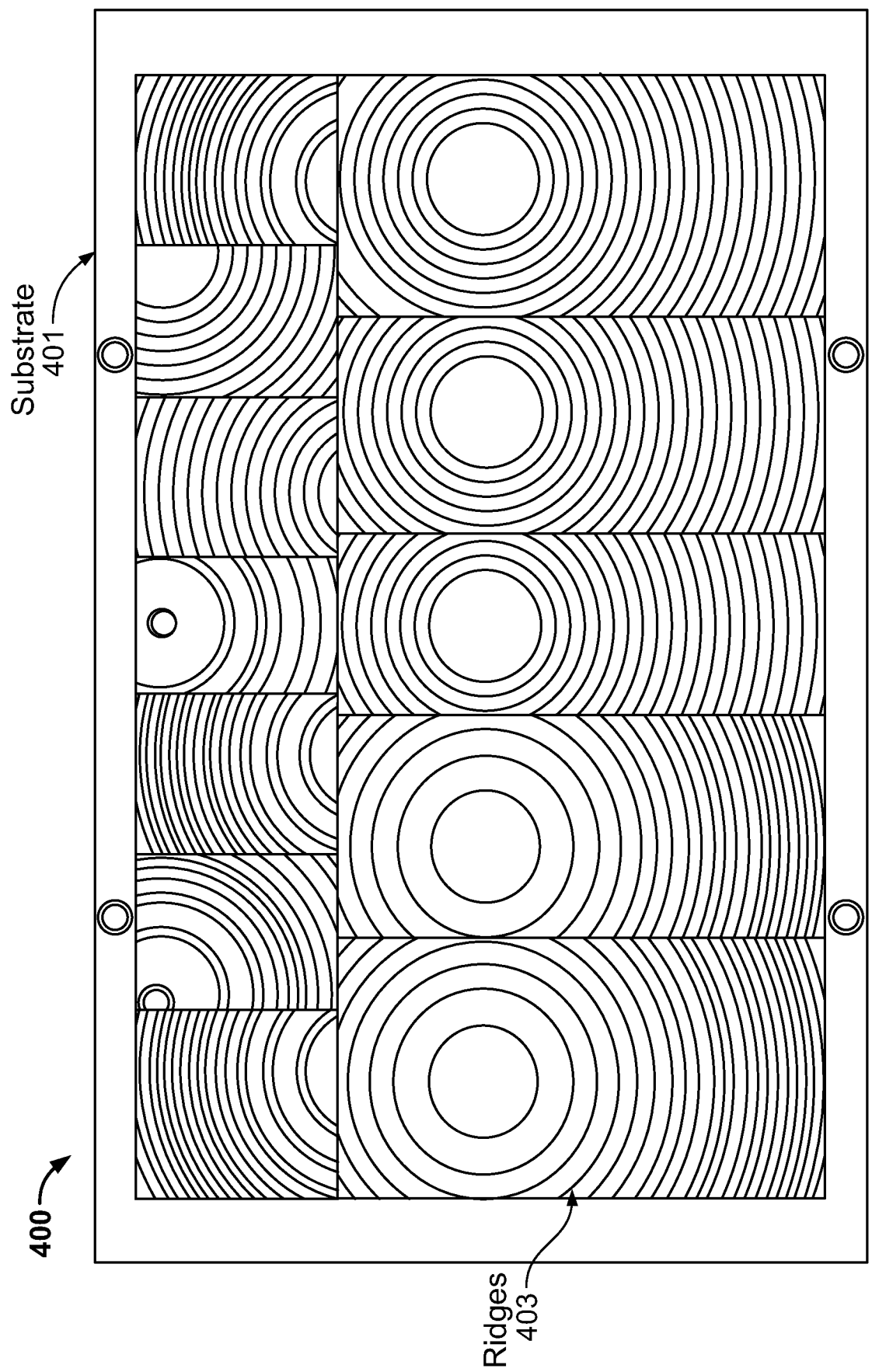
FIG. 4 illustrates an example Fresnel lens, in accordance with an example embodiment of the disclosure.

FIG. 4 illustrates an example Fresnel lens, in accordance with an example embodiment of the disclosure. Referring to FIG. 4, there is shown Fresnel lens 400 comprising a substrate 401 and ridges 403. Fresnel lenses, first utilized for lighthouses, enable large aperture lenses with short focal length without the mass and volume of a conventional spherical lens. The Fresnel lens typically comprises separate sections of surfaces with the same or similar curvature separated by discontinuities, as shown in FIG. 4. The ridges 403 represent adjacent surfaces, effectively flattened out from a "normal" lens, where the circular middle region is flattest and the adjacent surfaces slowly slope downward at the outer edges, although offset vertically to make a planar lens.

The Fresnel lens 400 is plastic in this example, although other materials are possible, depending on the desired flexibility and index of refraction, for example. The design of the Fresnel lens allows for almost limitless focal length and direction in the same size, where the size of the lens in FIG. 4 is approximately 2 cm×4 cm and 1 mm thick.

Figure 5:
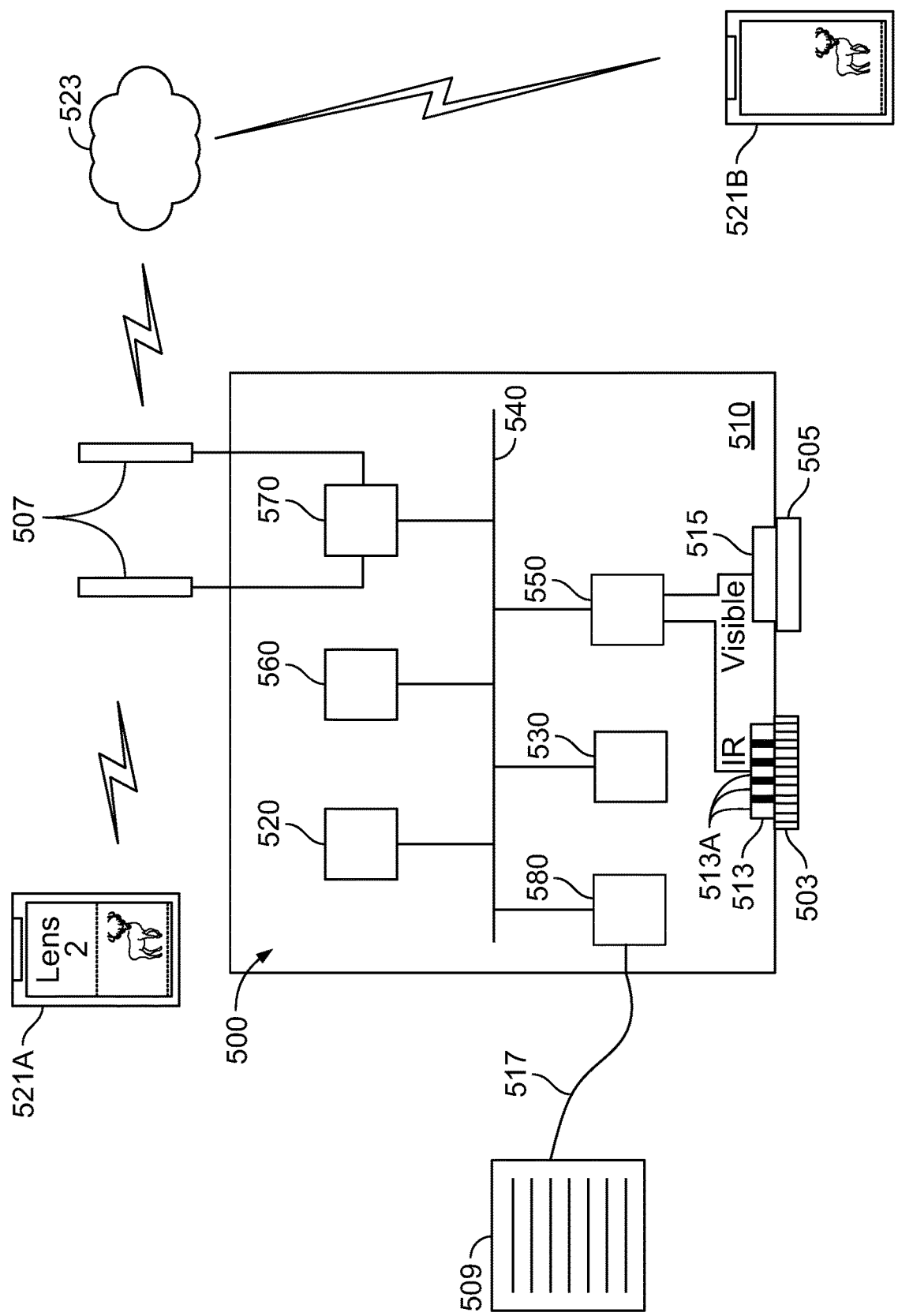
FIG. 5 illustrates circuitry of a cellular trail camera, in accordance with an example embodiment of the disclosure.

FIG. 5 illustrates circuitry of a cellular trail camera, in accordance with an example embodiment of the disclosure. Referring to FIG. 5, there is shown circuitry 500 within camera housing 510, where the housing may be substantially similar to housing 201 described with respect to FIG. 2. The circuitry 500 may comprise, for example, IR sensor 513, visible sensor 515, a processor 520, a memory 530, inputs 550, outputs 560, a transceiver 570, power circuitry 580, and solar cell 509. The various components of the circuitry 500 may be connected by one or more buses 540. The circuitry 500 may be powered by one or more batteries in the power circuitry 580, which may also comprise recharging circuitry for when the circuitry 500 is connected to a power source such as solar cell 509 by power cable 517, another battery, an electrical outlet, a charger, etc. There is also shown antennas 507, substantially similar to the antennas 207 described with respect to FIG. 2, that may be coupled to the transceiver 570 to increase wireless communication capability, and also Fresnel lens 503, visible lens 505, wireless devices 521A and 521B, and network 523.

The processor 520 may comprise, for example, one or more of the following: a central processing unit, a digital signal processor, a signal conditioner, a controller, a microcontroller, an encoder, a decoder, a communication processor, a graphics processor, etc. The processor 520 may also comprise, for example, analog-to-digital converters and/or digital-to-analog converters.

The wireless devices 521A and 521B may comprise cell or smart phones or tablets, for example, that are operable to interact wirelessly with the circuitry 500. In the example shown, the wireless device 521A may be in the vicinity of the camera and communicating directly with the circuitry 500 via the antennas 507, whereas the wireless device 521B may be remote from the camera and communicating with the circuitry 500 via a network 523, which may comprise a cellular network, such as 3G, 4G, LTE, 5G, and/or the Internet. In this manner, the wireless device 521B may monitor images or videos taken by the visible sensor 515 from any location with cellular or Internet access.

The wireless devices 521A and 521B may comprise software, such as an application or "app," that is operable to configure and interact with the camera via the circuitry 500. The application may allow a user to monitor images or video taken by the visible sensor 515 and also to overlay a field-of-view of the IR sensor 513 in a camera setup mode, based on the Fresnel lens 503 mounted to the housing 510.

The memory 530 may comprise, for example, one or more of the following: computer storage, volatile memory, non-volatile memory, rand access memory (RAM), read only memory (ROM, flash memory, solid state memory, semiconductor memory, electromagnetic memory, optical memory, hard drive, memory stick, memory card, etc. In some embodiments, the memory 530 may comprise memory that is removable such as a memory card for transferring memory contents from the camera 101/200 to a computer or a smart phone, for example. The same memory card or a different memory card may subsequently be inserted back into the camera 200. The memory 530 may, for example, store video, pictures, information, settings, and other data. The memory 530 may also store the initial, intermediate, and/or final results of calculations or algorithms performed by the processor 520. The memory 530 may also store code, software, and/or instructions that may be executed and/or run by the processor 520.

Inputs 550 may comprise, for example, one or more of the following: buttons, switches, touch-sensitive displays, microphones, etc. that form part of the housing 501. The inputs 150 may also include, for example, commands received from an external wireless device, such as a cell phone. An application on the external device may enable a configuration process for the camera 200, where the image and/or video captured by the camera using visible sensor 515 may be communicated to the wireless device 521A where an overlay may be superimposed on the image/video on the wireless device 521A indicating the field-of-view of the IR sensor 513, so that the user may indicate which Fresnel lens 503 is installed and observe what region of the visible field-of-view will have active IR motion sensing. The IR sensor 513 may comprise a plurality of elements 513A, comprising adjacent sections of infrared sensing material, each with a different electrical connection, such that a change in a differentia signal between elements 513A may indicate motion of a heat-generating animal.

Outputs 560 may comprise, for example, one or more of the following: touch-sensitive displays, screens, lights, light emitting diodes (LEDs), liquid crystal displays (LCDs), speakers, lasers, etc. In addition, data may be output to one or more external wireless devices 521A and 521B via the antennas 507.

The transceiver 570 may comprise one or more transceivers that are configured for wired and wireless communication. For example, the transceiver 570 may be configured to be connected to a cable or wire such as an Ethernet cable, a digital subscriber line (DSL), an optical cable, etc. The transceiver 570 may also be configured to connect to one or more antennas, such as the antennas 507, for wireless communication such as, for example, cellular communication (3G, 4G, LTE, 5G, etc. . . . ), WiFi communication, IEEE 802.11-compliant communication, Bluetooth communication, WiMax communication, multiple-input-multiple-output (MIMO) communication, radio communication, etc. In some embodiments, the transceiver 570 may be configured for direct communication (e.g., wired and/or wireless communication) with another device (e.g., a transceiver 570 in another camera or cell/smart phone, tablet, a storage device, etc.) such as the wireless device 521A, or indirect communication (e.g., via a base station, access point, cellular network, or Internet) with another device, such as the wireless device 521B. In some embodiments, the transceiver 570 may comprise, for example, one or more of the following: a signal conditioner, an upconverter, a downconverter, mixers, filters, amplifiers, etc.

In operation, a user may place a Fresnel lens 503 in the camera comprising the circuitry 500. A wireless device, such as wireless device 521A, may communicate with the transceiver 570 via the antennas 507, enabling a Fresnel lens configuration of the camera. An application on the wireless device 521A may assist in the configuration by displaying the target zone of the selected lens at the selected height of the camera by shadowing the target/trigger zone of a live picture transmitted by the transceiver 570. This may assist the user in setting their camera properly to target the area they intended.

When a specific Fresnel lens is affixed in the camera, the identification of the Fresnel lens 503 may be indicated by the user by entering a code on the wireless device, by scanning a QR code corresponding to the Fresnel lens 503, or automatically sensed by the circuitry 500. In one example, the configuration information may be sent via SMS message from the wireless device 521A to the camera circuitry 500. In another example, the type of Fresnel lens may be automatically sensed by a physical, electrical, or optical sensing of the lens. The camera may then be activated and the image and/or video captured by the visible sensor 515 may be communicated to the wireless device 521A where the indicated Fresnel lens causes the wireless device 521A to overlay the field-of-view of that specific Fresnel lens 503 on the wireless device display. In this manner, the camera 101/200 may be oriented as desired for heat/motion sensing and image/video capture in many different camera placements.

Once in place and oriented, when the camera senses a heat-generating target using the IR sensor 513, the visible image from the visible image sensor 515, which may be part of the input 550 and processed by the processor 520. The processor 520 may store the image signal in the memory 550. In some embodiments, the processor 520 may receive analog signals from the visible image sensor 515 and convert the analog signal into a digital signal, such as pixel data that may be stored in the memory 530. In some embodiments, the processor 520 may receive the image signal from the visible image sensor 515 and convert that image signal into an image (e.g., a picture) format or file or a video format or file. When the camera is in video mode, sounds may be converted into sound signals by a microphone of the inputs 550, which may then be combined (e.g., synchronized) by the processor 520, with the video images received from the visible image sensor 515 before being stored in the memory 550 and/or communicated to the wireless device 521A and/or 521B.

In another example scenario, the memory 550 comprises a removable memory such as a memory card that may be removed from the camera and inserted into a computer, for example, to view the images or to play the videos. In some embodiments, the output 560 or the transceiver 570 comprises a data port so that a computer, for example, may be connected to the camera and the images and/or videos may be downloaded or streamed to the computer for storing and/or viewing. In another example, the transceiver 570 may be used to transmit the images and/or videos to a computer over a wired connection (e.g., an Ethernet link) and/or a wireless connection (e.g., a Bluetooth link). The images and/or videos may be streamed or downloaded to a computer, for example.

In an example scenario, the outputs 560 may comprise a display, or a display may be connected to the output 560 or the transceiver 570. The processor 520, which may comprise a graphic processor and/or a graphic accelerator, may be used with the display to show the images and/or the videos stored in the memory 530. The outputs 560 may also comprise, for example, a speaker to play back sound in the stored video.

Figure 6:
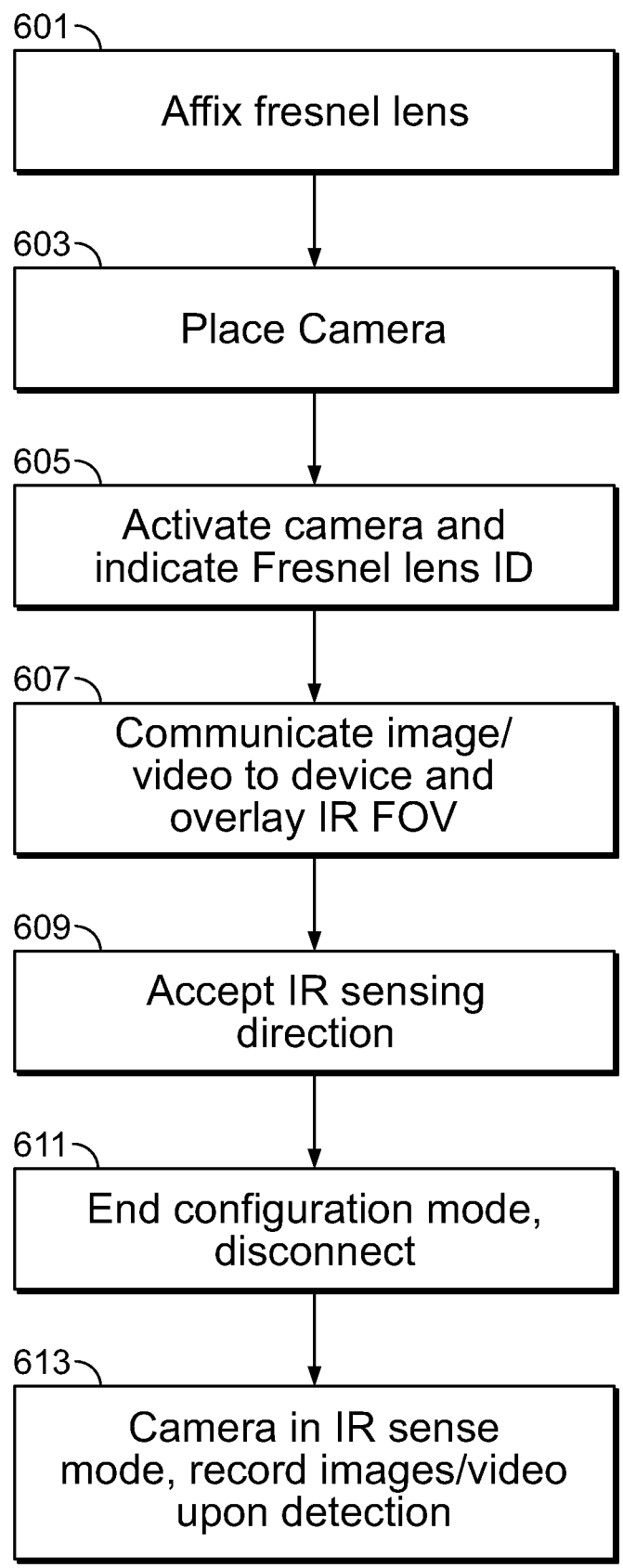
FIG. 6 is a flow diagram illustrating the configuration of a cellular trail camera with modular Fresnel lens, in accordance with an example embodiment of the disclosure.

FIG. 6 is a flow diagram illustrating the configuration of a cellular trail camera with modular Fresnel lens, in accordance with an example embodiment of the disclosure. The process starts in step 601, where a Fresnel lens may be coupled to the camera followed by step 603 where the camera is mounted in desired location using the mounting bracket.

In step 605, the camera may be activated using a button, switch, or touchscreen, or via a wireless device in communication with the camera. The type of Fresnel lens may be indicated by the user through an ID number entered on the wireless device coupled to the camera, through scanning a QR code or barcode, or automatically sensing by the camera, for example.

In step 607, the camera may communicate a live view video from the visible sensor to the wireless device where the field-of-view of the IR sensor may be overlaid on the image, either in a frame or shadow on the image, for example. The user may accept the camera and IR sensor configuration, or may adjust the position of the camera to a more desired direction with the current Fresnel lens, or may couple a different Fresnel lens if the desired visible and IR fields-of-view are not acceptable.

In step 611, once the aim is accepted, the configuration mode of the camera may be discontinued as well as of the wireless device, followed by step 613, where the camera may go into a low-power mode where only the IR sensor circuitry is active and the visible sensor and communication and processing circuitry is in a standby mode. These powered-down circuits may intermittently power back up as needed. Once a heat-generating object passes through the IR field-of-view, the visible sensor may begin recording images and/or video for storage and/or transmission.

In an example embodiment of the disclosure, a method and system is described for a cellular trail camera and may comprise a housing; a mounting bracket for mounting the camera; a visible sensor; an infrared sensor; and a plurality of Fresnel lenses each operable to be individually mounted to or with the infrared sensor and to focus infrared light to the infrared sensor from a different direction. One of the plurality of Fresnel lenses may be mounted to or with the housing during operation.

The housing may comprise a wireless transceiver, where the wireless transceiver communicates via a cellular network. The camera may communicate with a wireless communication device via the wireless transceiver. The camera may communicate images and/or video to the wireless device. The infrared sensor may comprise a plurality of elements. The camera may be powered by a solar cell that is mounted on the camera or remote from the camera. The visible sensor may be activated when the infrared sensor detects a heat-generating object. The Fresnel lens may comprise plastic. The camera may comprise one or more antennas coupled to the housing.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A camera system, comprising:
a camera comprising a visible sensor, a first lens, a second lens, an infrared sensor, a wireless transceiver, and a processor, wherein the first lens is operable to provide the visible sensor with a visible field-of-view, wherein the second lens is operable to provide the infrared sensor with a sensor field-of-view in which infrared light in the sensor field-of-view is directed to the infrared sensor, and wherein the camera is configured to permit replacing the second lens with a third lens operable to provide the infrared sensor with a different sensor field-of-view than the sensor field-of-view provided by the second lens; and
an external device configured to wirelessly update one or more parameters of the camera via the wireless transceiver, wherein the one or more parameters are related to motion detection capabilities of the infrared sensor; and
wherein, after receiving the one or more parameters, the processor is configured to place the camera in a low power mode in which the visible sensor and the wireless transceiver are placed in a standby mode and the infrared sensor remains active; and
wherein the infrared sensor is configured to:
detect motion in the sensor field-of-view while the visible sensor and wireless transceiver are in the standby mode; and
cause, in response to detected motion in the sensor field-of-view, the visible sensor to begin recording images; and
wherein the external device is configured to:
provide the camera with a first identifier that instructs the processor that the second lens is present and providing the infrared sensor with its sensor field-of-view; and
provide the camera with a second identifier that instructs the processor that the third lens is present and providing the infrared sensor with its sensor field-of-view.

2. The camera system of claim 1, wherein the external device is configured to receive and present images captured by the visible sensor of the camera.

3. The camera system of claim 1, wherein the external device is configured to present a visual depiction of the sensor field-of-view of the camera in relation to the visible field-of-view of the camera.

4. The camera system of claim 3, wherein:
the visual depiction presented by the external device comprises images captured per the visible sensor of the camera and a representation of the sensor field-of-view of the camera; and
the representation of the sensor field-of-view overlays the images captured per the visible sensor of the camera.

5. The camera system of claim 1, wherein:
the infrared sensor of the camera comprises a plurality of adjacent infrared sensing sections; and
the plurality of adjacent infrared sensing sections are configured to generate a differential signal indicative of motion of a heat-generating animal.

6. The camera system of claim 1, wherein the camera is configured to capture images via the visible sensor in response to motion detected by the infrared sensor.

7. The camera system of claim 1, comprising a solar cell coupled to the camera, wherein the solar cell is configured to provide power to the camera.

8. A method of a camera system, the method comprising:
receiving, with a wireless transceiver of the camera system, one or more parameters from an external device, wherein the one or more parameters are related to motion detection capabilities of the camera system;
replacing a first lens of the camera system with a second lens, wherein the second lens provides an infrared sensor of the camera system with a different sensor field-of-view than the first lens, and wherein the one or more parameters specify a sensor field-of-view provided by the second lens;
after receiving the one or more parameters, placing a visible sensor of the camera system and the wireless transceiver of the camera system in a standby mode while the infrared sensor of the camera system remains active;
in response to motion detected by the infrared sensor while the visible sensor and the wireless transceiver are in the standby mode, capturing images with the visible sensor of the camera system per the one or more parameters; and
transferring images captured by the visible sensor of the camera system to the external device.

9. The method of claim 8, comprising presenting, via the external device, a visual depiction of the sensor field-of-view for the second lens in relation to a visible field-of-view of the camera system.

10. The method of claim 9, comprising wirelessly receiving, with the external device, the visual depiction from the camera system.

11. The method of claim 9, wherein:
the visual depiction presented by the external device comprises images captured by the camera system and a representation of the sensor field-of-view; and
the representation of the sensor field-of-view overlays the images captured by the camera system.

12. The method of claim 8, comprising
generating, with a plurality of adjacent infrared sensing sections of the infrared sensor, a differential signal indicative of motion of a heat-generating animal; and
detecting motion of the heat-generating animal based on the differential signal indicative of motion.

13. A non-transitory computer readable medium comprising instructions that, when executed, cause a camera to:
configure at least motion detection capabilities of the camera based on one or more parameters received via a wireless transceiver of the camera;
enter a low power mode in which a visible sensor and the wireless transceiver are placed in a standby mode while an infrared sensor remains active; and
in response to motion detected with the infrared sensor while the visible sensor and the wireless transceiver are in the standby mode, capture images per the one or more parameters;
wherein a sensor lens of the camera is replaceable with a sensor lens that provides the infrared sensor with a different sensor field-of-view; and wherein the one or more parameters specify a sensor field-of-view provided by the sensor lens installed in the camera.

14. The non-transitory computer readable medium of claim 13, wherein the instructions, when executed, cause the camera to present a visual depiction of the sensor field-of-view for the camera in relation to a visible field-of-view of the camera.

15. The non-transitory computer readable medium of claim 14, wherein the instructions, when executed, cause the camera to wirelessly transmit the visual depiction to an external device.

16. The non-transitory computer readable medium of claim 14, wherein:
   the visual depiction comprises images captured by the camera and a representation of the sensor field-of-view of the camera; and
   the representation of the sensor field-of-view overlays the images captured by the camera.

* * * * *